No. 853,482. PATENTED MAY 14, 1907.
C. L. TAYLOR.
INGOT CHARGING CRANE.
APPLICATION FILED DEC. 22, 1905.
2 SHEETS—SHEET 2.
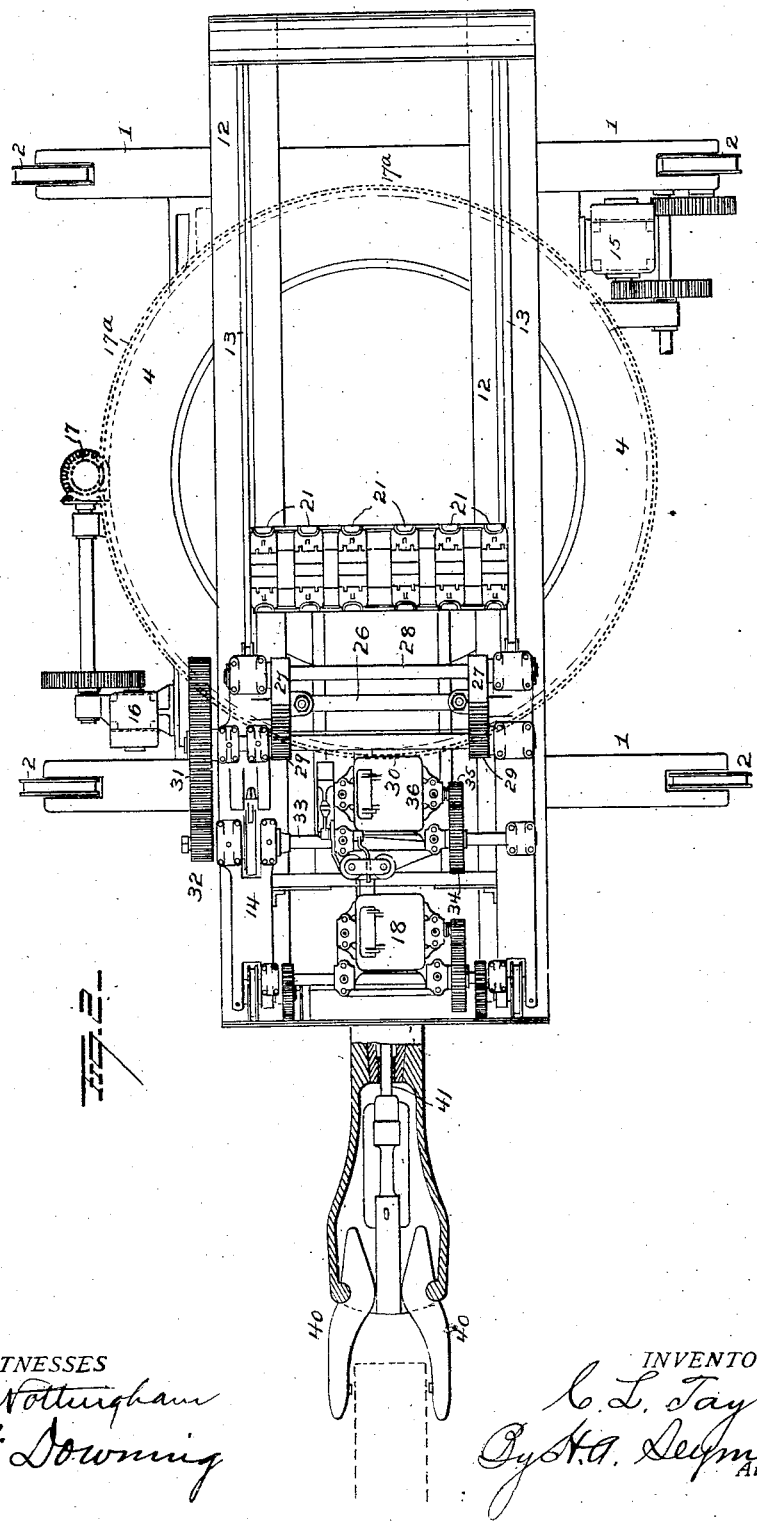

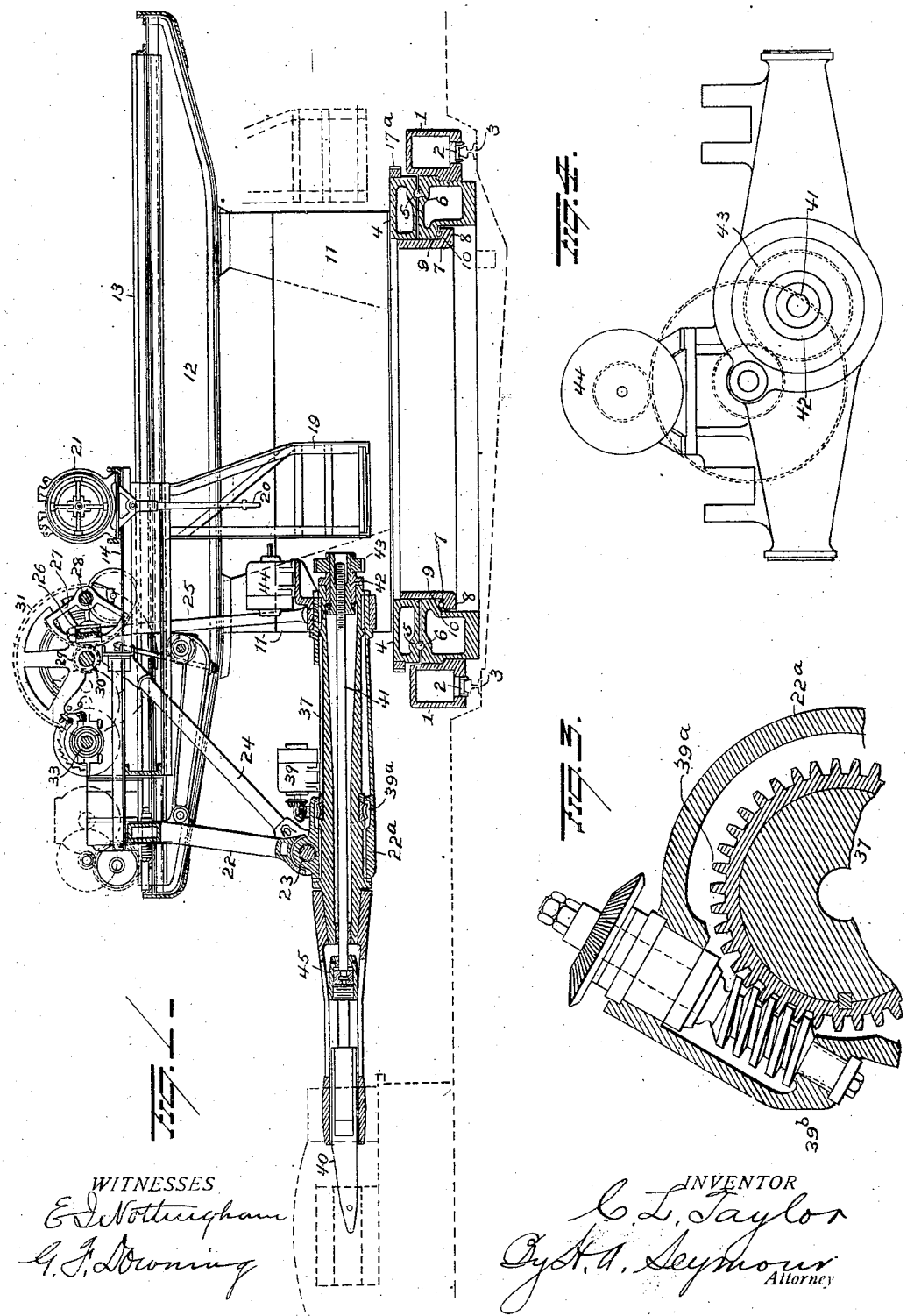

UNITED STATES PATENT OFFICE.

CLARENCE L. TAYLOR, OF ALLIANCE, OHIO, ASSIGNOR TO THE MORGAN ENGINEERING COMPANY, OF ALLIANCE, OHIO.

INGOT-CHARGING CRANE.

No. 853,482.      Specification of Letters Patent.      Patented May 14, 1907.

Application filed December 22, 1905. Serial No. 293,031.

*To all whom it may concern:*

Be it known that I, CLARENCE L. TAYLOR, of Alliance, in the county of Stark and State of Ohio, have invented certain new and useful Improvements in Ingot-Charging Cranes; and I do hereby declare the following to be a full, clear, and exact description of the invention, such as will enable others skilled in the art to which it appertains to make and use the same.

My invention relates to an improvement in ingot charging cranes, and it consists in the parts and combinations of parts as will be more fully described and pointed out in the claims.

In the accompanying drawings, Figure 1 is a view in longitudinal vertical section of my improved apparatus, Fig. 2 is a view in plan, the ingot charging bar being shown in section. Fig. 3 is a view in cross section showing the gearing for rotating the charging bar, and Fig. 4 is an end elevation of the charging bar and the cross head to which it is connected showing the gearing for actuating the tongs opening and closing mechanism.

1 represents a truck mounted on wheels 2 which latter travel on a trackway 3 running lengthwise the mill. Mounted on the truck is the circular turn table 4, the latter being carried on the spherical anti-friction bearings 5 mounted in a grooved trackway 6, the turn table 4 being also grooved to receive the spherical bearings. This turntable, is as before stated circular in form, with an open center, and is provided with a depending circular sleeve 7 having an outwardly projecting shoulder 8 which latter rests under the annular shoulder 9 formed on the circular member of truck 1, anti-friction spherical bearings 10 being introduced between the two shoulders and resting in grooves in said shoulders. The depending sleeve with its shoulder resting under a shoulder on the truck absolutely prevents any tipping of the turn table on the truck, while the spherical bearings interposed between said parts, reduce the friction to a minimum.

Secured to the turn table are upright frames or supports 11 carrying the parallel girders 12, which latter are provided on their upper surfaces with track rails 13 on which the trolley 14 travels lengthwise the girders.

The truck 1 is propelled by motor 15 coupled up by gearing with one pair of track wheels 2 (see Fig. 2); the turn table 4 is rotated by motor 16 and suitable gearing carried by truck 1, one pinion 17 of the gearing meshing with the rack 17$^a$ on the turn table, while the trolley is moved back and forth on the girders 12 by the motor 18, and gearing connecting the motor and one pair of track wheels supporting the trolley 14.

With the construction thus far described, it will be seen that the entire apparatus can travel on the floor rails 3 lengthwise the mill; the frames 11, girders 12, and trolley 14 can be turned by the rotation of the turn table 4, and the trolley moved back and forth on the girders 12, thus bringing the tongs carried by the charging bar, to any position within the limits of its movements, on both sides and at the ends of tracks 3.

The several motors already referred to, and those which rotate and tilt the charging bar and open the tongs to be hereinafter referred to, are all under the control of the operator located in cage 19 depending from the trolley 14, the operating levers 20 of the several controllers 21 projecting down into the cage within convenient reach of the operator. Depending from the trolley 14 near the front end of the latter is the yoke 22 to which the charging bar carrying frame 22$^a$ is pivoted as at 23, the latter being in a plane above the charging bar.

24 are braces which are secured at their upper ends to the trolley in rear of the yoke 22 and project downwardly and forwardly and are secured at their lower ends to the yoke at a point adjacent to the pivot 23. This yoke 22 and braces form a solid substantial and unyielding bearing on which the charging bar carrying frame 22$^a$ rocks. This frame 22$^a$ is as shown in Fig. 1, mounted on the pivot 23, and is pivotally connected at its rear end to the rods 25 which latter are connected at their upper ends to the bar 26 connecting the segmental gears 27. These gears 27 are secured to shaft 28 and are in mesh with pinions 29 on shaft 30. This shaft carries at its end a large toothed wheel 31, which meshes with pinion 32 on shaft 33. This shaft also carries a pinion 34 which meshes with the smaller pinion 35 on shaft of the motor 36. By means of this motor and gearing, the segments 27 may be turned to elevate or lower the rear end of the charging bar carrying frame 22ª and thus lower and elevate the tongs at the outer end of the charging bar.

The charging bar 37 is journaled at its ends in the charging bar frame 22ª, so as to rotate therein, and is provided with a circumferential worm 39ª engaged by a worm shaft 39ᵇ driven by the motor 39. By rotating the armature of the motor 39 the charging bar, may, through the gearing shown, be turned so as to present either side of the tongs up, or to turn any object held by the tongs.

The tongs 40, are opened and closed by the longitudinal movement of the rod 41 extending lengthwise through the center of the charging bar. The rear end of this rod is screw threaded, and is engaged by a nut 42 carrying a pinion 43. This pinion is actuated by gearing shown diagrammatically in Fig. 4, from the motor 44, and when rotated, moves the rod 41 longitudinally and opens and closes the tongs, the direction of movement of the tongs members being dependent on the direction of rotation of the nut 42.

The rod 41 is shown in two sections swiveled together, as shown at 45, so as to permit the outer end thereof, which actuates the tongs, to turn with the tongs without rotating the screw threaded rear section.

With the apparatus constructed as described, with the motor 39 for rotating the charging bar mounted on the bar carrying frame 22ª, the bar can be turned or rotated in its bearing, while its outer or tongs end is being raised or lowered as explained, and by mounting the tongs opening and closing motor on the frame 22ª the tongs can be opened and closed simultaneously with the rotary and tilting movements of the charging bar.

It is evident that many slight changes might be made in the relative arrangement of parts herein shown and described without departing from the spirit and scope of my invention hence I would have it understood that I do not wish to confine myself to the exact construction of parts shown and described, but, Having fully described my invention what I claim as new and desire to secure by Letters-Patent, is:—

1. In an ingot charging apparatus, the combination with a trolley, a support depending from same and a charging bar carrying frame pivotally secured to said depending support, of a charging bar journaled in said frame, tongs carried by said bar motor and gearing carried by the carrying frame for rotating the charging bar, a motor and gearing carried by the carrying frame for opening and closing the tongs, means carried by the trolley and engaging the carrying frame for rocking the latter and an operators cage independent of the carrying frame and suspended from the trolley.

2. In an ingot charging apparatus, the combination with a charging bar carrying frame, and a pivotal support for the latter, of a charging bar journaled in said frame, tongs carried by said bar, a two part tongs actuating rod connected with said tongs, the two parts of said rod having a swiveled connection, a motor and gearing for moving said tongs actuating rod to open and close the tongs, and a motor and gearing for rotating the charging bar in its carrying frame.

3. In an ingot charging apparatus, the combination with a truck adapted to travel on a track, a turn table on said truck, and an upright frame on said turntable, of a trolley mounted to travel on tracks carried by said upright frame and provided with a depending part, a charging bar frame pivoted to said depending part, a charging bar mounted to rotate in said carrying frame, motors and gearing for propelling the truck, for turning the turn table, for propelling the trolley for rotating the charging bar and for rocking the charging bar carrying frame, and an operators cage depending from the trolley and disconnected from the charging bar frame.

4. In an ingot charging apparatus, the combination with a truck, a turn table thereon, upright frames on said turn table, horizontal parallel girders carried by said frames, a trolley mounted to travel on said girders, a carrying frame depending from the trolley, a charging bar carried by said depending frame and ingot tongs at the end of the charging bar, of a motor and gearing for propelling the truck, a motor and gearing for rotating the turn table, a motor and gearing for propelling the trolley, a motor and gearing for rocking the depending carrying frame, a motor and gearing for rotating the charging bar, and a motor and gearing for opening and closing the tongs.

5. In a charging apparatus for furnaces, the combination of a truck mounted to travel on a track, a turn table carried on the truck, an upright frame secured to said turn table, a trolley mounted to travel on a horizontal track on said frame, a charging bar pivotally suspended from the trolley and mounted to rotate, motors and gearing for imparting the various movements to the several parts, and an operator's cage suspended from the trolley in the rear and independent of the charging bar.

In testimony whereof, I have signed this specification in the presence of two subscribing witnesses.

CLARENCE L. TAYLOR.

Witnesses:
FRANK J. RUTH,
N. C. FETTERS.